Patented June 20, 1939

2,163,013

UNITED STATES PATENT OFFICE 2,163,013

PRODUCTION OF VOLATILE FATTY ACID ANHYDRIDES

Hermann Schulz, Mainz-Mombach, Germany

No Drawing. Application November 10, 1934, Serial No. 752,474. In Germany November 17, 1933

4 Claims. (Cl. 260—546)

This invention relates to the production of anhydrides of volatile fatty acids.

It has been suggested to produce anhydrides of the higher fatty acids, e. g. palmitic acid, stearic acid or oleic acid by heating together the free acids with excess quantities of acetic anhydride in a closed pressure resistant tube at a temperature of about 150°. It must therefore be deemed impossible to reduce in this case the reaction temperature as well as the great excess (2.75 times of the theoretical amount) of acetic anhydride.

I have discovered the surprising fact that the above mentioned reaction may be performed with fatty acids of a lower molecular weight especially with those of a lower boiling point. This reaction occurs readily and it is not at all necessary to use pressure resistant tubes or vessels to increase the pressure and the temperature nor is the employment of greater excess of acetic anhydride required.

It is an object of the present invention to provide a method of producing anhydrides of volatile fatty acids.

It is another object of the present invention to provide an improved method of producing anhydrides of propionic acid, caproic acid, and the like.

The invention also contemplates the provision of a simple and efficient method of producing anhydrides of organic acids which makes possible production of such anhydrides economically and on a commercial scale.

Other and further objects and advantages of the present invention will appear from the following description and from the accompanying illustrative examples.

I am able to produce the anhydrides of the propionic acid, butyric acid, capronic acid in a simple manner by heating 2 mols of the carboxylic acid together with 1 mol acetic anhydride. I prefer to distill off continuously the free acetic acid which is produced by the conversion of the two reactants. The reaction occurs readily.

It is even possible to perform the reaction in vacuo, that is at very low temperatures.

The conversion of propionic acid, e. g. occurs according to the following equation:

$$(CH_3CO)_2O + 2CH_3CH_2COOH = 2CH_3COOH + (CH_3CH_2CO)_2O$$

When using the reaction components in stoichiometrical quantities, a conversion of 80–90% is obtainable. By the employment of a little excess of the carboxylic acid, e. g. propionic acid the utilisation may be rendered quantitative. It is most favorable for performing the reaction in a wide range, that the acetic acid is more volatile than any of the other reaction components, and therefore there is no difficulty in removing the latter by distillation and thus completing the conversion. The intermediate fractions which may occur between the acetic acid and the anhydride to be obtained and, for example, mixtures of acetic acid with portions of unconverted higher acids, produce on the other hand in the presence of an excess of anhydride, mixtures of some acetic acid with an excess of acetic acid anhydride. Decomposition need not be effected by a special procedure but these fractions and mixtures may be fully utilised again in the next reaction.

It is obvious that in order to utilise properly the anhydride available it is necessary that the acid supplied for the dehydrating action should as far as possible be anhydrous in order to avoid losses due to saponification of anhydride by water.

The reaction in most cases does not require the assistance of catalysts, although catalysts, especially of an acid character such as sulphuric acid, hydrochloric acid, phosphoric acid, zinc chloride and the like, in some cases on carriers may be employed. In general the reaction proceeds sufficiently rapidly at boiling temperatures without the addition of such substances, as shown by the examples hereinafter given.

The smooth course of the reaction enables it to be carried out continuously by continuously supplying a mixture of acetic anhydride and the acid to be dehydrated into a reaction vessel preferably comprising a distillation column having an adequate liquid content on individual floors, and continuously removing by distillation the acetic acid formed during the reaction—the resultant acid anhydride which may be in admixture with excess of the reactants, being discharged as a liquid. In order that the process may be completely continuous, a second column may be provided in which this liquid is freed by distillation from excess of reactants such as, for example, excess of the acid to be dehydrated, thereby ensuring complete utilisation of the acetic anhydride and obtaining from the outlet of this second column a continuous delivery of the desired anhydride in high percentage form.

It is not absolutely necessary to use the free acids as the original starting material for the production of the corresponding anhydride. It is possible to start with the esters, for example ethyl propionate which may first be converted by acetic acid into ethyl acetate and propionic acid, whereupon the acetic ester which forms may be removed by distillation leaving the propionic acid ready for the dehydrating process by the action of the acetic anhydride. The acetic acid necessary for the de-esterification can be completely recovered from the acetic ester and be converted into acetic anhydride for use in the production of the desired anhydride.

Example I 567 parts by weight of propionic acid having about 0.25% water content and 391 parts by weight of 92% acetic anhydride was heated to boiling point in a column having a dephlegmator. A part of the vapors was led away from the dephlegmator and condensed in a cooler. This condensate was pure acetic acid. The process was continued until the temperature of the vapors being led away exceeded the boiling point of acetic acid. Thereupon the receiver was changed, and an intermediate fraction was collected containing in addition to acetic acid the excess of the propionic acid employed. Finally the receiver was again changed to collect the propionic anhydride which went over as anhydride of 91.1% content. Through distillation losses, the yield in weight was diminished by 3.9%. As 421 parts of propionic anhydride. 100% estimated as 100% product were obtained, the yield in propionic acid anhydride, neglecting the loss referred to, was 97.7% of the theoretical.

Example II

In the same apparatus butyric anhydride was produced from butyric acid having 0.13% of water. 675 parts of 92% acetic anhydride and 1180 parts of butyric acid (10% excess) were used. The distillation losses amounted to 2.5% of the pure product. There were obtained 834 parts of glacial acid, also an intermediate fraction consisting of glacial acetic acid and butyric acid, and 983 grams of 89.8% butyric anhydride, i. e. 882.7 grams butyric anhydride absolute. Excluding distillation losses, therefore, the yield in butyric anhydride amounted to 95.9%.

Example III

In the same apparatus caproic anhydride was produced under vacuum. 675 parts of 92% acetic anhydride and 1575 parts of caproic acid having 0.6% of water were used. The distillation loss amounted to 5.5%. The yield in caproic anhydride was 1042 parts, estimated as 100% product, in the form of a 78.7% anhydride, that is after excepting distillation loss, 92.2% of the theoretical.

What I claim is:

1. The process of continuously producing a simple anhydride of a volatile fatty acid which comprises treating a fatty acid containing more than two carbon atoms with a substantially stoichiometric quantity of acetic acid anhydride at a boiling temperature of the mixture to cause the formation of acetic acid and the anhydride of the aforesaid fatty acid under treatment, continuously distilling off the acetic acid formed during the reaction substantially as soon as such acid is formed, continuing the aforesaid operations until the reaction is finished and practically no more acetic acid is formed, subsequently distilling off the excess of reaction components having a lower boiling point than the anhydride of the aforesaid fatty acid, and then recovering the simple anhydride of the fatty acid containing more than two carbon atoms by itself substantially devoid of mixed anhydrides without previous separation of mixed anhydrides whereby said simple anhydride is produced at a conversion of at least about 80%.

2. The process of continuously producing the simple anhydride of propionic acid which comprises treating an excess of the stoichiometric quantity of propionic acid with a substantially stoichiometric quantiy of acetic acid anhydride at the boiling temperature of the mixture to cause the formation of acetic acid and the anhydride of the propionic acid treated, continuously distilling off the acetic acid formed during the reaction substantially as soon as such acid is formed, continuing the aforesaid operations until the reaction is finished and practically no more acetic acid is formed, subsequently distilling off the excess of reaction components having a lower boiling point than the simple anhydride of propionic acid, and then recovering the said simple anhydride substantially devoid of mixed anhydride without previous separation of mixed anhydrides whereby said simple anhydride is produced at a conversion of at least 90%.

3. The process of continuously producing the simple anhydride of butyric acid which comprises treating butyric acid with a substantially stoichiometric quantity of acetic acid anhydride at the boiling temperature of the mixture to cause the formation of acetic acid and the anhydride of the butyric acid treated, continuously distilling off the acetic acid formed during the reaction substantially as soon as such acid is formed, continuing the aforesaid operations until the reaction is finished and practically no more acetic acid is formed, subsequently distilling off the excess of reaction components having a lower boiling point than the simple anhydride of butyric acid and then recovering the said simple anhydride substantially devoid of mixed anhydride without previous separation of mixed anhydrides whereby said simple anhydride is produced at a conversion of at least 80%.

4. The process of continuously producing the simple anhydride of caproic acid which comprises treating caproic acid with a substantially stoichiometric quantity of acetic acid anhydride at the boiling temperature of the mixture to cause the formation of acetic acid and the anhydride of the caproic acid treated, continuously distilling off the acetic acid formed during the reaction substantially as soon as such acid is formed, continuing the aforesaid operations until the reaction is finished and practically no more acetic acid is formed, subsequently distilling off the excess of reaction components having a lower boiling point than the anhydride of caproic acid, and recovering the said simple anhydride substantially devoid of mixed anhydride without previous separation of the mixed anhydrides whereby said simple anhydride is produced at a conversion of at least 80%.

HERMANN SCHULZ.